(No Model.)

A. H. ALLISON.
CHURN.

No. 314,772. Patented Mar. 31, 1885.

WITNESSES
Phil C. Dittrich
W. R. Keyworth

INVENTOR
Asa H. Allison
by
J. W. Alexander
ATTORNEY

N. PETERS, Photo-Lithographer, Washington, D. C.

UNITED STATES PATENT OFFICE.

ASA H. ALLISON, OF KNIGHTSTOWN, INDIANA.

CHURN.

SPECIFICATION forming part of Letters Patent No. 314,772, dated March 31, 1885.

Application filed July 2, 1884. (No model.)

*To all whom it may concern:*

Be it known that I, A. H. ALLISON, of Knightstown, in the county of Henry and State of Indiana, have invented certain new and useful Improvements in Churns; and I do hereby declare that the following is a full, clear, and exact description thereof, reference being had to the accompanying drawings, and to the letters of reference marked thereon, which form part of this specification, in which—

Figure 1:
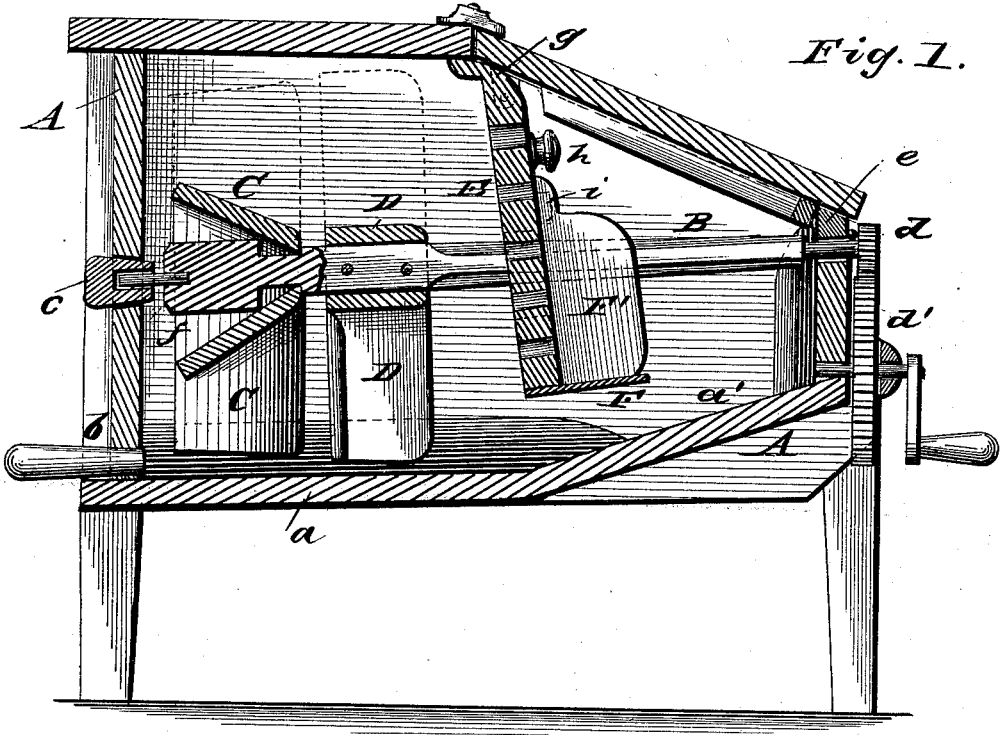
Figure 2:
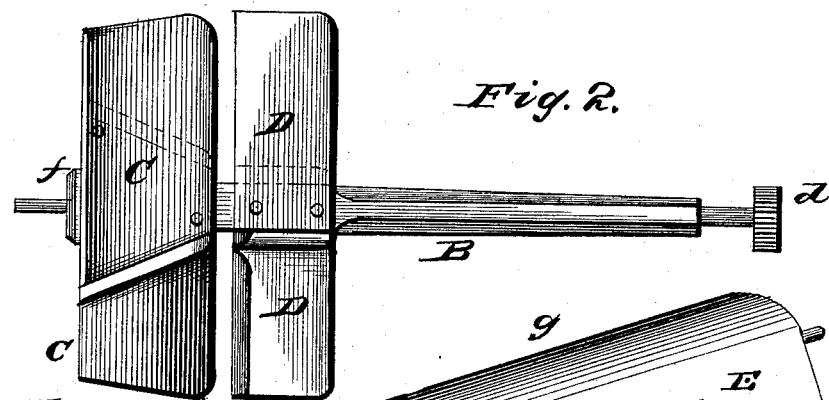
Figure 4:
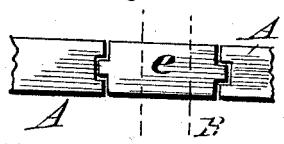
Figure 3:
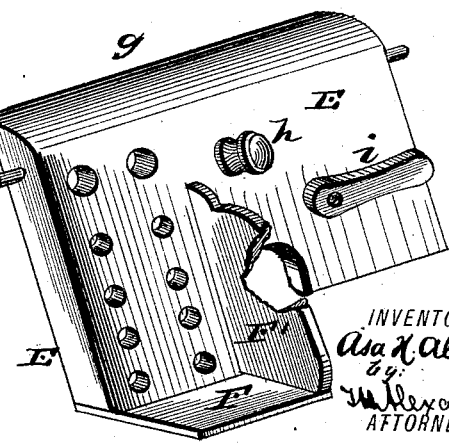

Figure 1 is a vertical longitudinal section through the improved churn, taken centrally. Fig. 2 is a side view of the rotary dasher removed from the churn-box. Fig. 3 is a perspective view of the swinging partition and butter-shelf removed from the churn-box. Fig. 4 is a detail view showing the manner of applying the gate or slide $e'$.

This invention relates to churns having dashers of the rotary kinds; and it consists in a novel construction of churn-dasher, and also in a swinging partition having a butter-collecting shelf, and adapted to cause a circular current of the milk when the dasher is rotated, all of which will be fully understood from the following description, when taken in connection with the annexed drawings.

A designates the churn-box, which is suitably mounted and constructed with a bottom, the part $a$ of which is horizontal, and the part $a'$ is inclined from the front end of the machine to the horizontal part, as shown in Fig. 1. At $b$ is a draw-off aperture closed by a plug, and at the lower side corners of the horizontal part of the floor are laterally-inclined planes for the purpose of directing the currents of milk inwardly or toward the dashers.

The top of the box is provided with a horizontal stationary cover and a front inclined removable cover. The dasher-shaft B is inclined from the front to the rear of the machine, and it is provided with a removable bearing-plug, $c$, at one end, and a pinion-spur, $d$, on the opposite end, which latter is outside of the box and engages with a large spur-wheel, $d'$, on the shaft of which is a hand-crank. The pinion end of the shaft B lies in a vertical notch, which is closed by a gate, $e$, that prevents the escape of milk during the operation of churning. The gate or slide $e$ has its sides tongued or beveled to fit in grooves made in the sides of the recess or notch in which the pinion end of shaft B rests. By removing said gate $e$ the dasher-shaft with its dashers can be taken out of the churn-box.

To the lower end of the shaft B are secured dasher-blades C, which are tangent to the axis of the shaft and arranged obliquely with respect thereto, so that their effect upon the milk is to dash it forward and outward, somewhat upon the principle of a screw-propeller. These blades C have beveled and front edges, and they are rigidly secured to a beveled polygonal enlargement, $f$, of the shaft B.

In front of the oblique dasher-blades C are four dasher-blades, D, secured to a polygonal portion of the shaft B at right angles thereto. These blades D have beveled or slightly feathered sides, and their action on the milk is to dash it outward and slightly backward to antagonize the forwardly-flowing currents.

E designates a partition which is hung by pins from the sides of the churn-box, so that it is allowed to swing freely, and which is constructed with a rounded lipped upper end, $g$, in close relation to the front edge of the fixed top of the box A. One-half of this partition E is thickly perforated for the passage of air, and this perforated portion extends nearly down to the bottom of the churn-box, and is provided with an inclined butter arrester or shelf, F, having a side board, F', next the dasher-shaft B. The other side of the partition E is made shorter than the perforated portion, and has its lower edge rounded on the side next the dash-blades for allowing the free passage of the milk under it during the operation of churning. The partition is recessed over the dasher-shaft, and is provided with a handle, $h$, and a latch or pin, $i$, by which it can be held in the churn at any desired angle. The pin or latch $i$ will bind against the side of the churn-box A when in the position shown in Fig. 3, and hold the partition E in place by its contact with the side of the box. In Fig. 1 the partition is shown in a position to swing freely and gather the light floating particles of butter from the circulating currents of milk. When the operation of churning is finished and the butter collected on the shelf F, by reversing the partition E in the churn, or by lifting the partition out of its place and then putting it back with the lip g free of the cover of the box, the milk will be allowed to drip from the butter back into the churn.

The operation is as follows: The partition E being adjusted so that it will swing freely, a rapid rotary motion is imparted to the dasher-shaft. The dashers will forcibly induce currents of milk forward beneath the longest portion of the partition, which currents will be directed up the inclined floor to the highest end thereof. The current will then descend again and pass back beneath the shortest portion of said partition to be again acted on by the dasher and be forced back again into the front compartment of the churn-box. In this manner it will be evident that I obtain a rotation and circulation of the milk, at the same time freely supplying it with air and gathering the floating particles of the butter on the shelf F. The partition E being caused to swing forward and backward during the churning operation, it will act like a fan and create air-currents in the churn-box, which can pass freely from one side of this partition to the other through the perforation in it and facilitate the process.

Having described my invention, what I claim is—

1. The combination of dashers on an inclined dasher-shaft with a churn-box having an inclined and a horizontal floor and a swinging partition, all constructed and adapted to operate substantially in the manner and for the purposes described.

2. The swinging partition constructed with a beveled and lipped upper end, with short and long portions, and with perforations on one side of its center, in combination with a churn-box having an inclined floor and dashers on an inclined rotary shaft, substantially as and for the purposes described.

3. The combination, with a churn-box, of the partition having a butter-arresting shelf and the dasher-blades adapted to produce a rotary current of the milk beneath said partition, substantially as described.

4. The combination, with the removable dasher-shaft, of the removable bearing-plug at one end, a gate at the opposite end, and a removable partition astride of said shaft on a churn-box, substantially as described.

In testimony that I claim the foregoing as my own I affix my signature in presence of two witnesses.

ASA H. ALLISON.

Witnesses:
GEORGE T. BANNETT,
WM. STUART.